US012750741B2

(12) United States Patent
Qi et al.

(10) Patent No.: US 12,750,741 B2
(45) Date of Patent: Sep. 29, 2026

(54) MULTICAST BROADCAST SERVICE RECEPTION AVAILABILITY

(71) Applicant: ZTE Corporation, Shenzhen (CN)

(72) Inventors: Tao Qi, Shenzhen (CN); Lin Chen, Shenzhen (CN); Hao Zhu, Shenzhen (CN); Liping Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 277 days.

(21) Appl. No.: 18/478,467

(22) Filed: Sep. 29, 2023

(65) Prior Publication Data

US 2024/0040441 A1 Feb. 1, 2024

Related U.S. Application Data

(63) Continuation of application No. PCT/CN2021/084880, filed on Apr. 1, 2021.

(51) Int. Cl.
*H04W 36/00* (2009.01)

(52) U.S. Cl.
CPC ... *H04W 36/0007* (2018.08); *H04W 36/0061* (2013.01)

(58) Field of Classification Search
CPC ......... H04W 36/0072; H04W 36/0061; H04W 36/0007; H04W 4/06; H04W 72/30; H04W 76/20; H04W 76/38; H04W 76/27; H04W 80/02; H04W 76/40; H04W 76/25; H04W 48/20; H04W 48/12; H04L 5/0096
USPC ................................ 370/328, 329, 330, 331
See application file for complete search history.

(56) References Cited

U.S. PATENT DOCUMENTS 11,470,676 B2 * 10/2022 Chen ..................... H04L 5/0096
2013/0039250 A1 2/2013 Hsu
2016/0073302 A1 3/2016 Yang et al.
2022/0132467 A1 * 4/2022 Shrivastava .......... H04W 48/16
2023/0180064 A1 * 6/2023 Fujishiro ............... H04W 76/40 370/331
2023/0189083 A1 * 6/2023 Zhong ..................... H04W 4/06 370/331

(Continued)

FOREIGN PATENT DOCUMENTS

CN 102118355 A 7/2011
CN 107231619 A 10/2017

(Continued)

OTHER PUBLICATIONS

International Search Report and Written Opinion received for Application No. PCT/CN2021/084880 mailed Jan. 5, 2022 (9 pages).

(Continued)

*Primary Examiner* — David Q Nguyen
(74) *Attorney, Agent, or Firm* — Crowell & Moring LLP

(57) ABSTRACT

Multicast Broadcast Services ("MBS") is a service provided to user equipment ("UE") devices. As the UE moves through the network, it may switch between network cells. Some network cells include MBS service availability, which will be considered by the UE when selecting cells. MBS service continuity can be maintained when the UE considers MBS service availability for selecting network cells. The service availability of MBS can be determined by the UE while the UE is in an inactive or idle state.

18 Claims, 7 Drawing Sheets

(56) References Cited

U.S. PATENT DOCUMENTS

| | | | | |
|---|---|---|---|---|
| 2023/0269828 | A1* | 8/2023 | Shrivastava | H04W 72/30 370/312 |
| 2023/0362960 | A1* | 11/2023 | Adjakple | H04W 4/40 |
| 2023/0388866 | A1* | 11/2023 | Di Gorolamo | H04W 36/0007 |

FOREIGN PATENT DOCUMENTS

| | | | | |
|---|---|---|---|---|
| EP | 4207936 | A1 * | 7/2023 | H04W 68/005 |
| WO | WO 2014/161200 | A1 | 10/2014 | |

OTHER PUBLICATIONS

Zte, et al. "3GPP TSG-RAN WG2 Meeting #113 electronic R2-2101215," *General asgects of NH MBS*, Jan. 15, 2021 (11 pp.).

Extended European Search Report, Nov. 11, 2024, pp. 1-10, issued in European Application Number 219339504, European Patent Office, Munich, Germany.

Korean-language Notice of Allowance with English summary issued in Korean Application No. 10-2023-7033934 dated Dec. 8, 2025, (8 pages).

* cited by examiner

MULTICAST BROADCAST SERVICE RECEPTION AVAILABILITY

PRIORITY

This application claims priority as a Continuation to PCT/CN2021/084880, filed Apr. 1, 2021, published as WO 2022/205291A1, entitled "MULTICAST BROADCAST SERVICE RECEPTION AVAILABILITY", the entire disclosure of which is incorporated by reference.

TECHNICAL FIELD

This document is directed generally to wireless communications. More specifically, it is directed to Multicast/Broadcast Service ("MBS") service continuity for a user equipment ("UE").

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment ("UE") are becoming more complex and the amount of data communicated continually increases. In order to improve communications and meet reliability requirements for the vertical industry as well as support the new generation network service, improvements should be made to maintain and ensure service standards for Multicast Broadcast Services ("MBS") in wireless communication networks. Mission critical communication services may be implemented by using MBS.

SUMMARY

This document relates to methods, systems, and devices for determining service availability for Multicast Broadcast Services ("MBS") by a user equipment ("UE"). During cell selection, the UE considers MBS service continuity when the UE re-selects network cells by determining MBS service availability at neighboring network cells. The service availability of MBS can be determined by the UE while the UE is in RRC_INACTIVE or RRC_IDLE state.

In one embodiment, a method for service continuity of a multicast broadcast service ("MBS") by a user equipment ("UE") in a wireless network includes receiving control information, the control information comprising a service area information, a frequency information, a cell information, and an association between the service area information, the frequency information, and the cell information, and includes determining a service availability for the MBS based on the control information. The service area information may be a service area identity ("SAT") list, the cell information is a physical cell identification ("PCI") list, the frequency information is an absolute radio frequency channel number, and the association may indicate that cells identified by the PCI list on the associated frequency belong to the associated SAT. The method may include receiving a user service description ("USD") from a service layer, and determining whether a service is available in specific cells on specific frequencies based on whether the SAT associated with the UE interested MBS services indicated in the USD is also indicated in the access layer control information, and include considering whether the interested MBS service is available in the cells on a frequency associated with the SAT. The UE handles a cell reselection procedure for selecting a cell from a plurality of cells based on awareness by the UE of MBS service availability in the cells on the specific frequencies. The method may include considering, during a priority handling in cell reselection, the frequency on which the UE interested MBS service is available to be a highest frequency. The cell reselection may be based on a cell ranking that includes an offset for MBS that is added to the cell-ranking criterion for cells on which the MBS service is available. The offset for MBS may be configured with the control information, or in another system information block. When the UE has reselected a cell which provides the MBS service that UE is interested in, the method may include receiving the MBS service based on a last valid MBS resource allocation configuration received before the cell reselection, and avoiding performing PDCP re-establishment at cell change. The control information may include a mapping of all or part of identification for each of the SAT, the cell information, and the frequency information into an index, and the association between the indexes and, the SAT, the cell information, and the frequency information. The control information may be received from one or more system information blocks ("SIB"). Part of the control information may be in the one or more SIB s, and part of the control information is in a multicast control channel ("MCCH").

In another embodiment, a method for service continuity of a multicast broadcast service ("MBS") by a network element in a wireless network includes providing control information over an access layer, wherein the control information comprises a service area information, a frequency information, a cell information, and an association between the service area information, the frequency information, and the cell information. The control information may be provided in one or more system information blocks ("SIB"). Part of the control information may be in the one or more SIBs, and part of the control information may be in a multicast control channel ("MCCH"). The network element may provide the control information to a user equipment ("UE") and the UE handles the cell re-selection based on a service availability for the MBS of that cell based on the provided control information. The selecting may be based on a frequency priority handling or a cell ranking, further wherein the cell ranking includes an offset for MBS. The offset may be configured to the UE with the control information, or in a separate system information blocks ("SIB").

In another embodiment, a method for service continuity of a multicast broadcast service ("MBS") by a user equipment ("UE") in a wireless network includes receiving a service area information of the MBS, and determining a service availability for the MBS based on the service area information. The service area information of the MBS may be a physical cell identification ("PCI") list with frequency information associated with each PCI, which indicates that MBS service is available on such cell on the associated frequency. The UE may handle a cell reselection procedure for selecting from a plurality of cells based on the MBS service availability in the cells on the associated frequency. The method may include considering, during a priority handling in cell reselection, a frequency on which the UE interested MBS service is available to be a highest frequency. The cell reselection is based on a cell ranking that includes an offset for MBS that is added to the cell-ranking criterion for cells on which the MBS service is available. When UE has not reselected a cell, the method may further include initiating Radio Resource Control ("RRC") resume with a cause value indicating a failure of MBS service continuity. The service area information of the MBS may include a service area including at least one of a tacking area identity ("TAI") list, tacking area code ("TAC") list, a RAN area code ("RAC") list, a service area identity ("SAI") list, system Information Area ID list, a new radio ("NR") cell global identifier, or a MBS service area identification that can identify an MBS area in RAN ("MAIR"). The method may include checking whether a reselected cell belongs to service area information based on the information provided in the re-selected cell. MBS service area identification that can identify an MBS area in RAN ("MAIR") may be broadcast in the reselected cell in one or more system information blocks ("SIB") or in a multicast control channel ("MCCH"). When the UE has reselected a cell belonging to a configured service area, the method includes receiving the MBS service based on last valid MBS resource allocation configuration received before the cell reselection, and avoiding performing PDCP re-establishment at cell change. When the UE has not reselected a cell, the method may include initiating Radio Resource Control ("RRC") resume with a cause value indicating a failure of MBS service continuity.

In another embodiment, a method for service continuity of a multicast broadcast service ("MBS") by a Radio Access Network ("RAN") node in a wireless network includes providing a service area information for the MBS from an access layer to a user equipment ("UE"). The service area information of the MBS may be a physical cell identification ("PCI") list with frequency information associated with each PCI, which indicates that MBS service is available on such cell on the associated frequency. The UE may perform a cell reselection fora plurality of cells based on the service availability configuration for the selected cell. The service area information of the MBS may include a service area including at least one of a tacking area identity ("TAI") list, tacking area code ("TAC") list, a RAN area code ("RAC") list, a service area identity ("SAI") list, system Information Area ID list, a new radio ("NR") cell global identifier, or a MBS service area identification that can identify an MBS area in RAN ("MAIR"). MBS service area identification may identify an MBS area in RAN ("MAIR") is broadcast in the reselected cell in one or more system information blocks ("SIB") or in a multicast control channel ("MCCH").

In another embodiment a method for service continuity of a multicast broadcast service ("MBS") by a user equipment ("UE") in a wireless network includes receiving control information, the control information comprising a service area information, a frequency information, a cell information, and an association between the service area information, the frequency information, and the cell information, and includes determining a service availability for the MBS based on the control information. The receiving may be from an access layer. The UE may be in an idle state or an inactive state for the receiving and the determining. The control information may be for one cell from a plurality of cells, wherein each of the plurality of the cells has different control information. The method may include selecting one cell from the plurality of cells based on the determined service availability for the MBS for the selected cell. The selecting by the UE may ensure the service availability of the MBS, further wherein the selecting is performed for cell reselection by the UE. The UE may be in an idle state or an inactive state for the reselection and the UE monitors the control information in an access layer. The reselection may be based on a frequency priority handling that prioritizes frequencies from the plurality of the cells, further wherein frequencies for the cells that have service availability for MBS are higher priority for the frequency priority handling. The reselection may be based on a cell ranking that includes an offset for MBS and the offset for MBS is added to a measurement quantity, a hysteresis value, and an offset between cells for the cell ranking. The control information may be received from one or more system information blocks ("SIB"). Part of the control information may be in the one or more SIBs, and part of the control information in a multicast control channel ("MCCH"). The frequency information may include an absolute radio frequency channel number. The cell information may include a physical cell identity ("PCI"). The UE may be preconfigured with user service description ("USD") information that is available from a service layer and includes an MBS identification ("MBS ID") and the service area information. The association between the SAI, the frequency information, and the cell information may include a mapping of identification for each into an index.

In another embodiment, a method for transmitting a multicast broadcast service ("MBS") by a network element in a wireless network, includes providing control information over an access layer, wherein the control information comprises a service area information, a frequency information, a cell information, and an association between the service area information, the frequency information, and the cell information. The control information may be provided in one or more system information blocks ("SIB"). The network element may provide the control information to a user equipment ("UE") and the UE selects a cell based on a service availability for the MBS of that cell based on the provided control information. The UE may be in an idle state or an inactive state for the selecting. The selecting by the UE may ensure the service availability of the MBS, further wherein the selecting is performed for cell reselection by the UE. The selecting may be based on a frequency priority handling or a cell ranking, further wherein the cell ranking that includes an offset for MBS.

In another embodiment, a method for selecting from a plurality of cells for multicast broadcast service ("MBS") service continuity by a user equipment ("UE") in a wireless network includes receiving a service availability configuration for the MBS from a Radio Access Network ("RAN") node from an access layer, and selecting one of the cells based on the received service availability configuration. The UE may be configured with cell information from a Radio Resource Control ("RRC") information, wherein the cell information is to indicate that UE interested MBS is available on the configured cells. The service availability configuration for the MBS may include an area code list. The area code list may include at least one of a tacking area identity ("TAI") list, tacking area code ("TAC") list, a RAN area code ("RAC") list, a service area identity ("SAI"), or a system information area identification list. The service availability configuration for the MBS may include a MBS service area identification that can identify an MBS area in RAN ("MAIR"). The service availability configuration for the MBS may include a new radio ("NR") cell identity list. The service availability configuration for the MBS may include a physical cell identification ("PCI") list with frequency information associated with the PCI. The UE may be in an idle state or an inactive state for the receiving and the selecting. The selecting may be based on a frequency priority handling that prioritizes frequencies from the plurality of the cells, further wherein frequencies for the cells that have service availability for MBS are higher priority for the frequency priority handling. The selecting may be based on a cell ranking that includes an offset for MBS and the offset for MBS is added to a measurement quantity, a hysteresis value, and an offset between cells for the cell ranking. The service availability configuration may be applied to the plurality of cells to continue MBS service continuity with each of the plurality of the cells.

In another embodiment, a method for transmitting a multicast broadcast service ("MBS") by a network element in a wireless network includes providing a service availability configuration for the MBS from an access layer, and receiving a selection for a cell based on the service availability configuration. The providing may be from a Radio Access Network ("RAN") node. The providing may be to a user equipment ("UE"). The UE may perform the selection for the cell from a plurality of cells based on the service availability configuration for the selected cell. The service availability configuration may be applied to the plurality of cells to continue MBS service continuity with each of the plurality of the cells. The service availability configuration for the MBS may include at least one of an area code list, a MBS service area identification that can identify an MBS area in RAN ("MAIR"), a new radio ("NR") cell identity list, or a physical cell identification ("PCI") list with frequency information associated with the PCI. The selecting may be based on a frequency priority handling or a cell ranking, further wherein the cell ranking that includes an offset for MBS.

DETAILED DESCRIPTION

Figure 1:
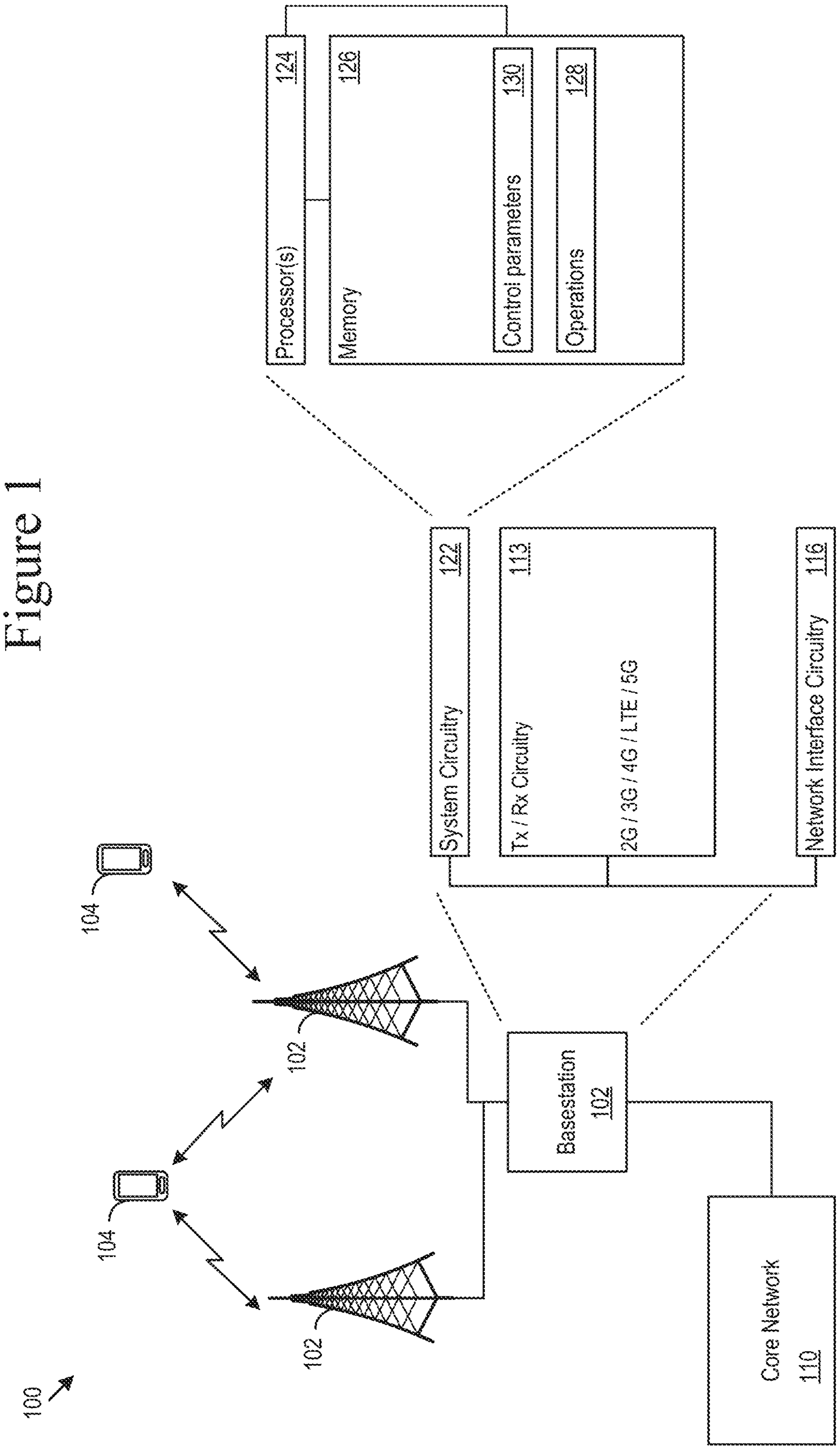
FIG. 1 shows an example basestation.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

This document relates to methods, systems, and devices for determining service availability for Multicast Broadcast Services ("MBS") by a user equipment ("UE"). As the UE moves through the network, it may re-select among network cells. Due to UE mobility UE may re-select from a cell with MBS to a potential cell without MBS that UE is interested in, which would interrupt MBS service reception. MBS service continuity is realized by the UE determining MBS service availability for neighboring network cells and re-selecting to the cells with MBS. The continuity of service for MBS may be referred to as the maintenance of MBS service. The service availability of MBS can be determined by the UE while the UE is in RRC_INACTIVE or RRC_IDLE state.

Multicast Broadcast Services ("MBS") has been provided in wireless systems to some extent. One of such examples includes mission critical communication service such as Mission Critical Push to Talk ("MCPTT") over MBS. For an MCPTT service, once the uplink unicast radio bearer (typically Guaranteed Bit Rate ("GBR")) is established for a group call, it stays allocated to the UE for the entire duration of the group call, whether the user ever talks or not. However, the traffic model for group call shows that the radio bearer may be actually used relatively rarely, namely only when the user has the floor. In particular, in the case of mission critical broadcast group, only one talker such as a chief officer can have the floor. As such, a lot of uplink resource may be wasted. On the other hand, there may be a large number of users joining an MCPTT session, and the number may exceed the limit a cell may be able to support. When this happens, a user may be denied of service because there is not enough uplink radio resource or access resource.

The various implementations below describes a mechanism for supporting MBS sessions for a UE in RRC_INACTIVE or RRC_IDLE state. There may be various Radio Resource Control (RRC) states, such as RRC connected (RRC_CONNECTED), RRC inactive (RRC_INACTIVE), and RRC idle (RRC_IDLE) state. The embodiments described below relate to the RRC_INACTIVE and RRC_IDLE states, which are sometimes referred to as non-RRC_CONNECTED states. The UE may receive MBS data even it is in RRC_INACTIVE or RRC_IDLE state.

Under this mechanism, dedicated radio resources is assigned to a UE on demand. That is, the dedicated radio resources is only assigned to a UE when the UE needs to have the floor, or the UE needs to have the dedicated radio resources for some other purposes such as updating some parameters with the base station. While in the RRC_INACTIVE or RRC_IDLE, configuration from network is provided to UE to determine MBS service availability.

FIG. 1 shows an example basestation 102. The basestation 102 may also be referred to as a wireless network node or a next generation radio access network ("NG-RAN") node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

Figure 2:
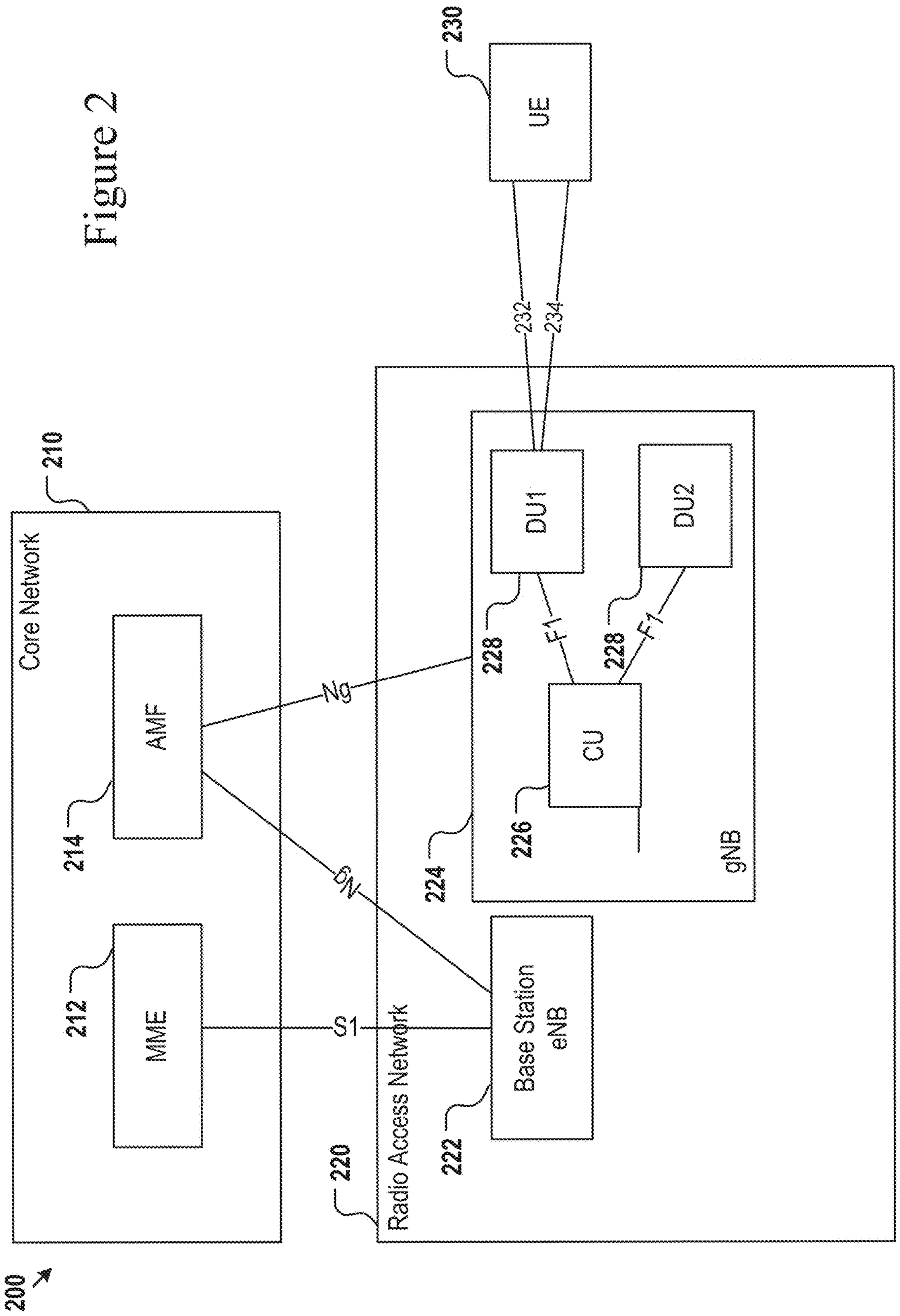
FIG. 2 shows an example wireless communication network.

FIG. 2 shows an exemplary wireless communication network 200 that includes a core network 210 and a radio access network (RAN) 220. The core network 210 further includes at least one Mobility Management Entity (MME) 212 and/or at least one Access and Mobility Management Function (AMF) 214. Other functions that may be included in the core network 210 are not shown in FIG. 2. The RAN 220 further includes multiple base stations, for example, base stations (BS) 222 and 224. The base stations may include at least one evolved NodeB (eNB) 222 for 4G LTE, or a next generation NodeB (gNB) 224 for 5G New Radio (NR), or any other type of signal transmitting/receiving access device such as a UMTS NodeB. The example eNB 222 communicates with the MME 212 via an S1 interface. Both the eNB 222 and gNB 224 may connect to the AMF 214 via an Ng interface.

The gNB 224 may further include a central unit (CU) 226 and at least one distributed unit (DU) 228. The CU and the DU may be co-located in a same location, or they may be split in different locations. The CU 226 and the DU 228 may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 200 may also include at least one User Equipment (UE) 230. The UE 230 may be implemented as mobile or fixed communication devices which are capable of accessing the wireless communication network 200. The UE 230 may include but is not limited to mobile phones, laptop computers, tablets, personal digital assistants, wearable devices, IoT/NB-IoT devices, MTC/eMTC devices, distributed remote sensor devices, roadside assistant equipment, and desktop computers. The UE 230 may communicate with the base station through Over the Air (OTA) radio communication interface and resources. As shown in FIG. 2, the OTA interface may include multiple ratio carriers 232 and 234. A radio carrier may further be an anchor carrier or a non-anchor carrier. Each base station may further support at least one cell and a physical location may be covered by multiple cells. The UE 230 may choose a best cell to camp on or connect to for wireless service.

The wireless communication network 200 may be implemented as, for example, a 2G, 3G, 4G/LTE, or 5G cellular communication network. Correspondingly, the base stations 222 and 224 may be implemented as a 2G base station, a 3G NodeB, an LTE eNB, or a 5G NR gNB (even though, the base station 222 is labeled as an eNB and the base station 224 is labeled as gNB for illustration purposes).

While the description below focuses on cellular wireless communication systems as shown in FIG. 2, the underlying principles are applicable to other types of wireless communication systems supporting wireless devices. These other wireless systems may include but are not limited to Wi-Fi, Bluetooth, ZigBee, and WiMax networks.

Cell Reselection

Figure 3A:
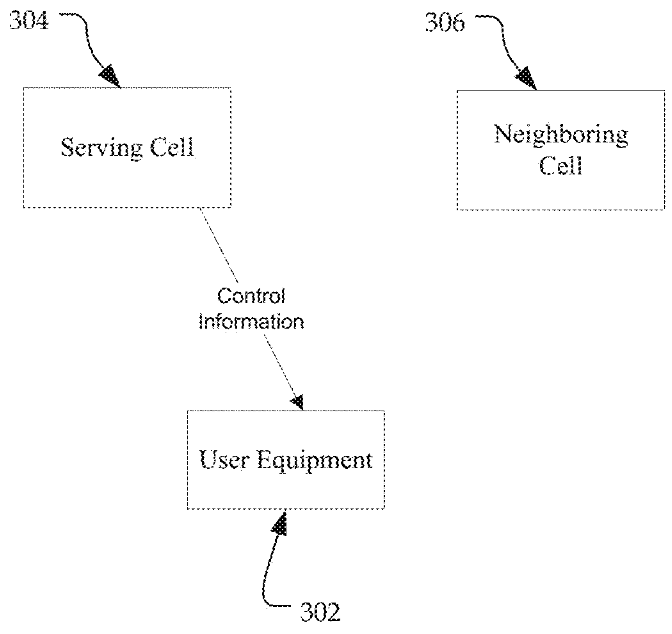
FIG. 3*a* shows an example interaction between user equipment ("UE") and cells.
Figure 3B:
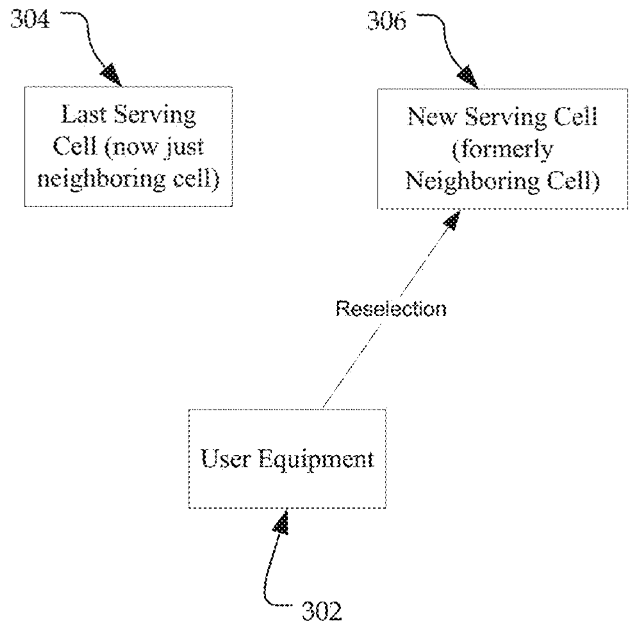
FIG. 3*b* shows an example changing of cells by user equipment ("UE").

FIG. 3*a* shows an example interaction between user equipment ("UE") and cells. FIG. 3*b* shows an example changing of cells by user equipment ("UE"). This interaction may be referred to as cell reselection. In FIG. 3*a*, UE 302 is connected to a serving cell 304. However, there is a neighboring cell 306 that the UE 302 may connect with as the UE is moving between cells. As described above, each basestation may support at least one cell. Although not shown, there may be multiple neighboring cells 306 that are considered by the UE 302. The UE 302 receives control information from the serving cell 304 which is used to determine UE interested MBS service availability when the UE re-selects to specific neighboring cells on specific neighboring frequencies. The control information is further described below. The UE 302 uses the control information to determine whether the neighboring cell 306 should be re-selected to. FIG. 3*b* shows the UE 302 re-selecting from the serving cell 304 (now the last serving cell) to the neighboring cell 306 (now the new serving cell). After the re-selection, UE 302 camps on the new serving cell 306. The control information from FIG. 3*a* can be used to determine which among a plurality of neighboring cells have service availability for MBS. As described, the control information may be received while the UE is in an idle or inactive state, such as RRC_INACTIVE or RRC_IDLE. The UE 302 can choose among the neighboring cells based on which neighboring cells have MBS service availability. This process may be referred to cell reselection.

One of the goals of cell reselection described herein is to maintain MBS reception during mobility and to reduce service interruption. Multicast Broadcast Services ("MBS") may refer to Broadcast communication service and/or Multicast communication service. The MBS service continuity can be realized during cell selection by selecting cells with MBS service availability. There may be a distinction between Broadcast and Multicast as described below, but the described embodiments cover both. The availability of MBS or service availability of MBS includes both the cases that the service will be available or is already available.

Broadcast communication service or Broadcast service has the same service and the same specific content data provided simultaneously to all UEs in a geographical area. In other words, all UEs in the broadcast coverage area are authorized to receive the data. A broadcast communication service is delivered to the UEs using a broadcast session. A UE can receive broadcast communication service in RRC_IDLE, RRC_INACTIVE and RRC_CONNECTED states.

Multicast communication service or Multicast service has the same service and the same specific content data provided simultaneously to a set of UEs, which may not be all UEs in the multicast coverage area. Some UEs may not be authorized to receive the data. A multicast communication service is delivered to the UEs using a multicast session. A UE can receive multicast communication service in RRC_CONNECTED state with mechanisms such as point-to-point ("PTP") delivery and/or Hybrid Automatic Repeat Request ("HARQ") feedback/retransmission. A UE might be able to receive multicast communication service in RRC_IDLE or RRC_INACTIVE state. MBS can also be used to describe a service type, i.e., Multicast and Broadcast Service, either for new radio ("NR"), or in LTE, or in any other wireless communication systems. Another example service type is Unicast service. NR MBS or 5G MBS or MBS might be used interchangeably to describe the feature or technique set in 3GPP to support MB S in 5G system or specifically in NG-RAN. Evolved Multimedia Broadcast and Multicast Services ("eMBMS") can be a feature or technique set in 3GPP to support MBS in EPS/LTE, or the service type of MBS.

For new radio ("NR") Multicast and Broadcast Service (NR MBS) or 5G MBS, the associated area of MBS may be smaller (from single cell to a few cells) and dynamic because of the service requirements, UE location distribution, or other requirements for the service to be dynamically delivered to an area, which might change. As a result, the UE cell reselection process may be modified to help the UE with the service continuity of MBS reception in RRC_IDLE or RRC_INACTIVE states.

For the cell reselection, the UE may receive the configuration from the network that UE camps on. The UE receives the configuration in a service layer to be aware of a service description such as the User Service Description ("USD"). The service layer may also be referred to as the application layer and may indicate a communication layer other than the access layer. The USD may include any signaling in service or application layer that carries the information for UE to discover the MBS service, or to be aware of the availability of the MBS service in specific region, or in which time duration. USD may be distributed to UE in service layer.

Based on the configuration in the service layer and in the access layer, the UE evaluates current serving cell and neighboring cells. Specifically, the UE monitors the link quality and/or the MBS reception quality in the serving cell/neighboring cell based on the configuration that the UE receives, and determines if it will re-select to another cell based on the configuration.

UE Awareness of the MBS

Figure 4A:
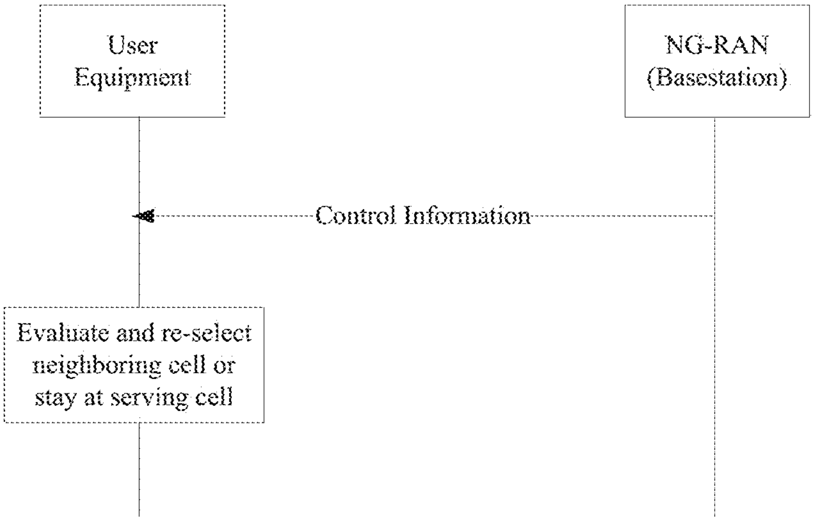
FIG. 4*a* shows an example communication.

FIG. 4*a* shows an example communication, which may be based on control information provided to the UE. In other embodiments, the configuration discussed above may provide the information for a cell selection. FIG. 4*a* illustrates that the basestation (aka NG-RAN) provides control information to the UE. The control information is applied in the cell re-selection procedure. It may also be used for comparing the current serving cell with the neighboring cells. The cell reselection process and the control information is further described below.

The cell reselection procedure may include reselection priorities handling, and Intra-frequency and equal priority inter-frequency Cell Reselection criteria. Reselection priorities handling includes how to determine the frequency priority in cases of inter-frequency or inter radio access technology ("RAT") cell re-selection. The UE may consider the frequencies, which enable the UE to receive the MBS service to be of the highest priority. Intra-frequency, equal priority inter-frequency cell reselection criteria may be used to determine the cell ranking among cells. This may include the cells that provide and do not provide the MBS service. There may be a cell-ranking criterion Rs for serving cell and Rn for neighboring cells. The ranking can be modified with an MBS offset to help UE choose the cell to receive or continue receiving the MBS service. The reselection priorities handling, intra-frequency and equal priority inter-frequency cell reselection criteria may depend on the UE awareness of the MBS availability on specific frequency, specific cells.

The control information that is used for locating the cells that provide the MBS may include service area information, frequency information, cell information and the association among each. The control information may be provided in the access layer. The control information indicates that the cell (identified by the cell information) on a specific carrier frequency (identified by the frequency information) belongs to a certain service area (identified by the service area information). The frequency information may be an absolute radio frequency channel, a new radio ("NR") frequency, an Evolved Universal Terrestrial Radio Access ("E-UTRA") carrier frequency, or identified by absolute radio-frequency channel number ("ARFCN") value. The cell information may include physical cell ID ("PCI") information. The service area information may be SAI. The association of this information is further illustrated in FIGS. 5-7.

The UE might receive or be pre-configured with the USD information from the service layer, which includes the MBS ID of the MBS service that the UE is interested in. In cell reselection, the cell being considered may be referred to as a potential cell or a candidate cell. The UE might receive or be pre-configured with service area information associated with the MBS service that indicates that the MBS service identified by the MBS ID may be available in the associated service area that is identified by the service area information.

Based on the control information that the UE receives from the access layer, and the USD from the service layer, the UE is able to determine the MBS service availability. The determination may be which cells on which frequencies is providing UE interested service. If the SAI associated with those MBS services (as indicated in USD) is also indicated in the access layer information, then the UE considers it to be available in the cells on the frequencies associated with the SAI. The UE determines MBS service availability for certain cell(s) on certain frequency(ies) based on the control information.

In one embodiment, the UE receives the USD of the interested MBS in the service layer. The USD includes the MBS ID, and the associated MBS service area information (e.g., the SAI or SAI list). In the current serving cell, a UE in RRC_IDLE or RRC_INACTIVE monitors the control information in the access layer. For example, the UE monitors a system information block (SIB) which provides the MBS service area information (e.g., SAI or SAI list), carrier frequency list, cell information (e.g., physical cell identity/PCI) and the association among them. The carrier frequency list includes the current carrier frequency (i.e. for the current serving cell), and the neighbor frequencies (i.e. for the neighboring cells).

In one embodiment, the mechanism of UE awareness of the MBS availability on neighboring frequencies and neighboring cells may be based on information in the USD provided in the service layer, and a system information block ("SIB") that is broadcast in the serving cell in access layer. The UE may determine service availability based on service area identity ("SAI") information in an SIB and in USD. The SAI is an identifier to uniquely identify an area which can be frequency agnostic and can be mapped onto one or more cells.

The UE combines the information from the SIB and the USD to determine the availability of the service (on which cells and on which frequency) identified by an MBS ID that the UE is interested in. The MBS ID may be TMGI, or a IP Multicast address (with or without source address), or any other unique ID for the UE to identify the MBS service. If the information included in the SIB broadcast in the serving cell includes a cell on a carrier frequencies which is further associated with an SAI, and the SAI is also included in the USD of the MBS UE is interested in, the UE considers if the MBS service (identified by the MBS ID) is available on the cell on that frequency. In NR or 5G, the MBS may be broadcast in discrete cells rather than on a frequency layer. Therefore, the UE can precisely locate the cells that provide the MBS service with a finer granularity.

Figure 5:
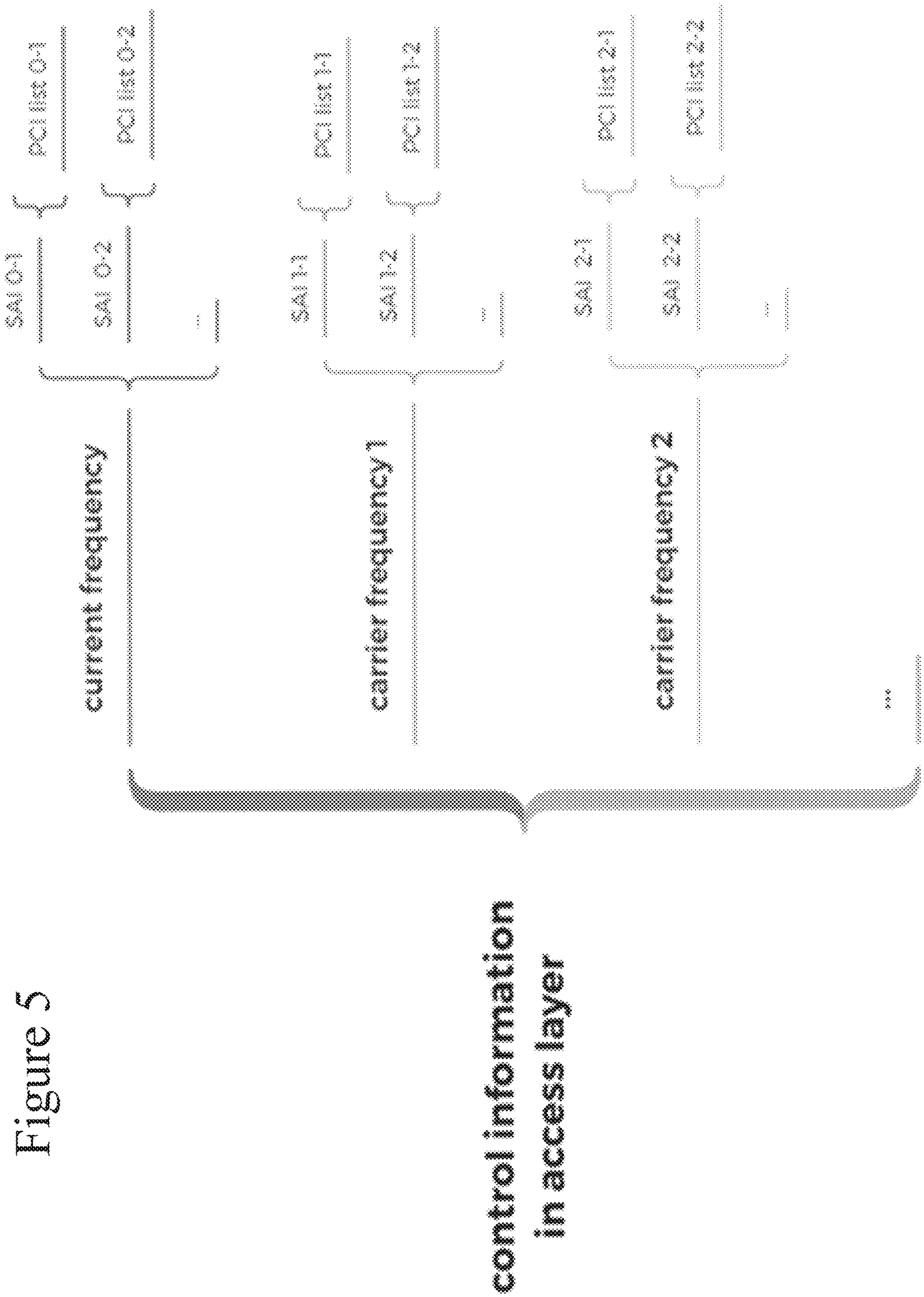
FIG. 5 shows an example control information association.

FIG. 5 shows an example control information association. Specifically FIG. 5 illustrates an example SIB information content and structure. The SIB may include the control information as structured by current carrier frequency, the associated SAI, and the PCI list further associated with the SAI, and neighboring carrier frequencies (e.g. carrier frequencies other than the current frequency, including carrier frequency 1, carrier frequency 2 . . . ), the associated SAI, and PCI list further associated with the SAI. Cells identified by the PCI list 1-1 of the carrier frequency 1 belong to SAI 1-1, and another PCI list 2-2 of the carrier frequency 2 belongs to SAI 2-2. This is merely one example of the structure of the control information association in the access layer.

There may be many other embodiments for structuring the control information in the access layer. Other information structure options may have a different order of carrier frequency, SAI and PCI. Some embodiments may provide less overhead in the signaling design.

Figure 6:
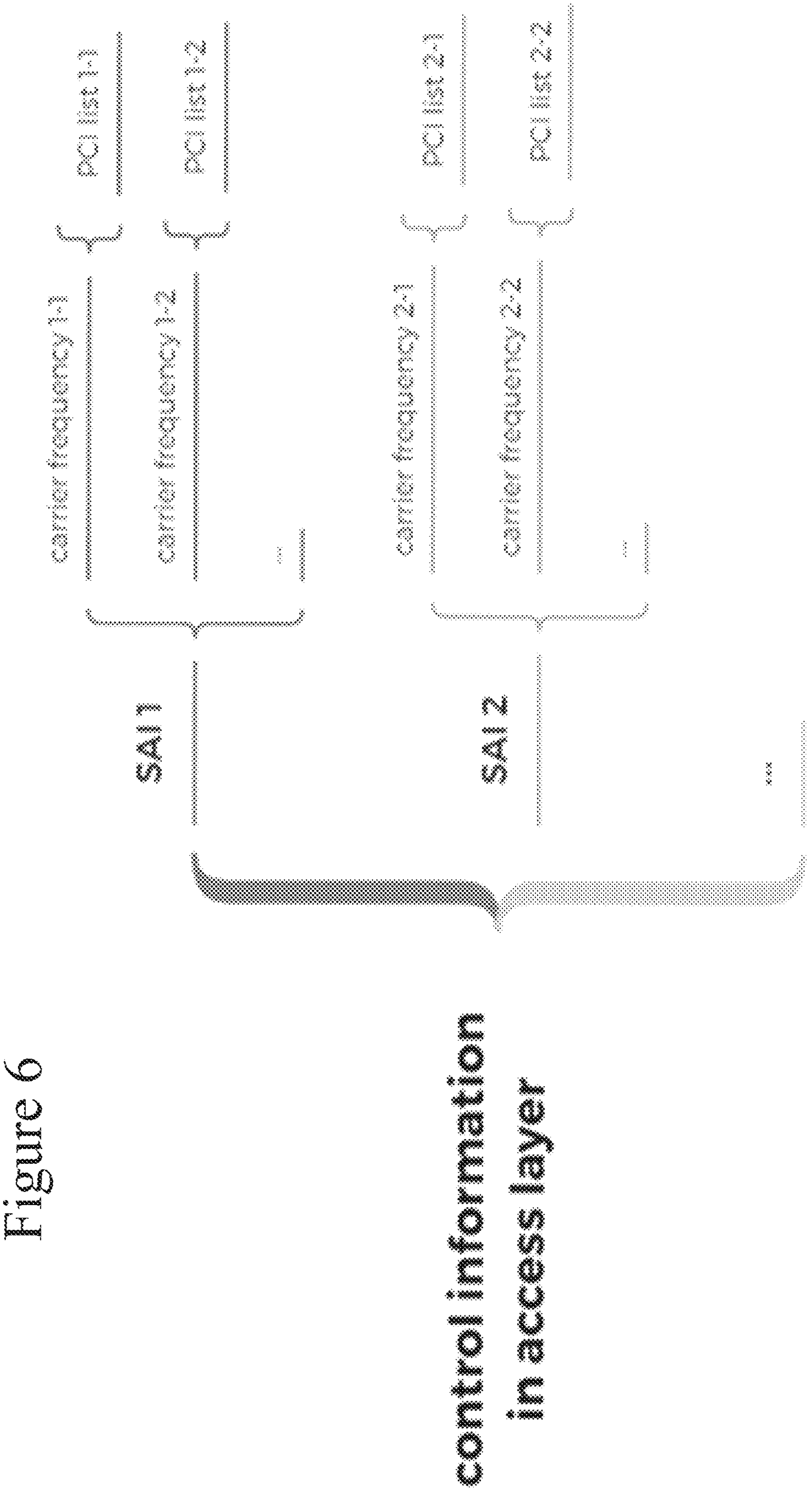
FIG. 6 shows another example control information association.

FIG. 6 shows another example control information association. In this embodiment, the information in the SIB is structured with each SAI in the SIB being associated with a frequency list, while each carrier frequency is further associated with a PCI list. This embodiment indicates that in all the neighboring frequency (including the current frequency) and neighboring cells (including the current cell), the cells in the PCI list 1-1 of carrier frequency 1-1, and the cells in the PCI list 1-1 of carrier frequency 1-2 belong to SAI1.

Figure 7:
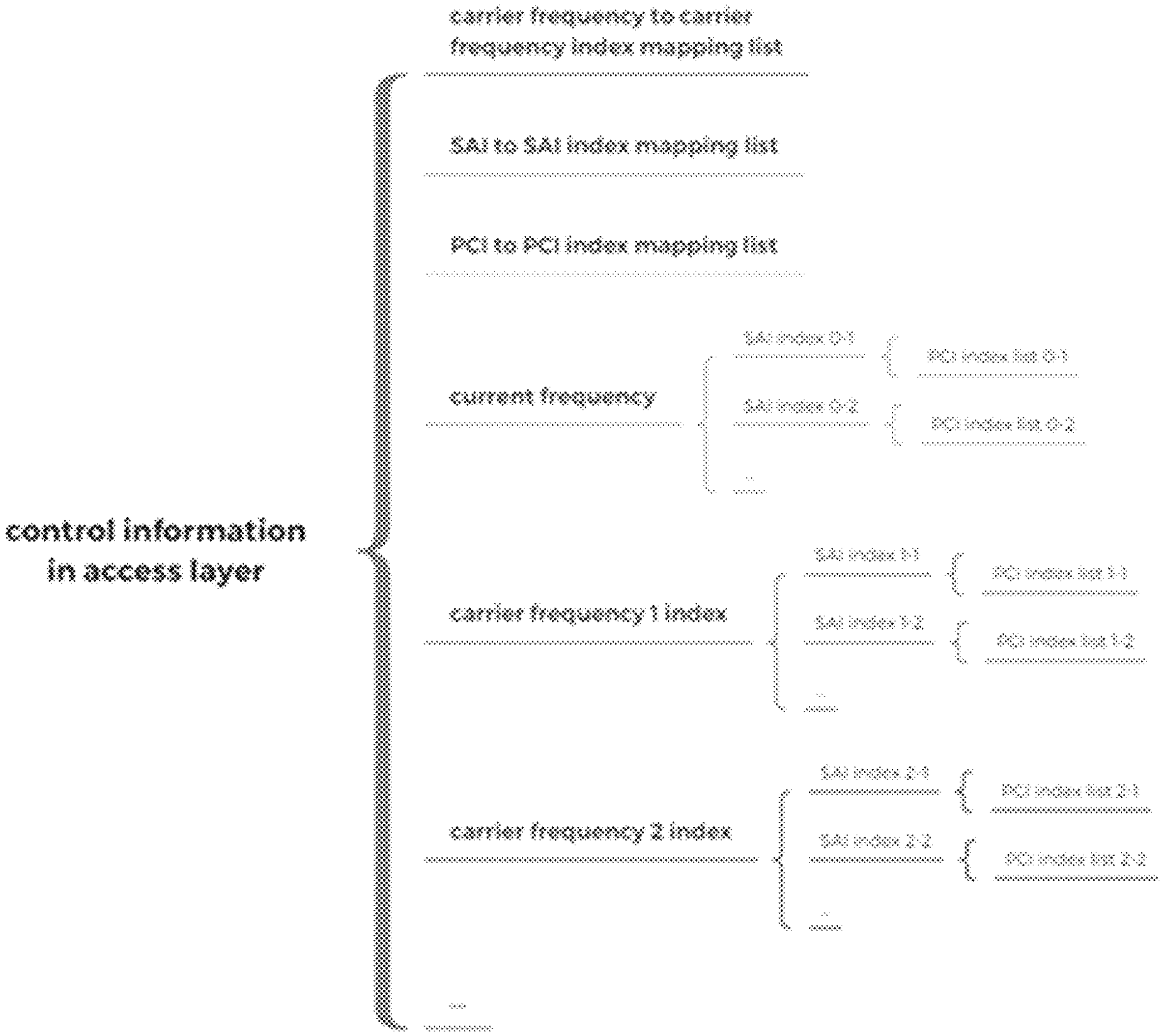
FIG. 7 shows an example control information index.

FIG. 7 shows an example solution based on control information index. In this embodiment, the control information in the access layer is mapped into an index. This may reduce the overhead of the control information in the access layer. In one embodiment, part or all of the information is expressed as the index, rather than the entirety of the information. One example embodiment for the association of the indexes of SAI, PCI, or carrier frequencies is shown in FIG. 7. The information of the mapping of the SAI to the index for SAI, the mapping of carrier frequency to the index for carrier frequency, and the mapping of PCI to the index for PCI are shown along with the association among the indexes.

In some embodiments for the examples described above, more than one carrier frequency or cells can be associated with the same MBS service area. Further, the same frequency or cell can be associated with more than one MBS service areas. The associations may be a multiple to multiple association.

Based on the combination of the information UE receives from the SIB information and USD, the UE determines whether the MBS service UE is interested in is available or will be available in at a specific carrier frequency and/or at specific cells. For example, the USD indicates for MBS1, it is associated with MBS-ID1, and SAI1, SAI2 (i.e. an SAI list includes two SAI IDs). In the SIB information broadcast in the serving cell UE camps in, it includes carrier frequency f1, and associated SAI2, and the PCI list (PCI1, PCI2, PCI3) that are associated with the SAI2. Since SAI2 is associated with MBS-ID1 in the USD, UE considers that the MBS service identified by MBS-ID1 is available at least in the cells identified by (PCI1, PCI2, PCI3) on frequency f1.

In one embodiment, the control information may be transmitted in an SIB. However, in other embodiments, there may be multiple SIBs for the control information. All or part of the control information in access layer can be transmitted in more than one SIB, dedicated signaling, broadcast control channel (e.g., multicast control channel ("MCCH")), or any combination of them. For example, part of the control information might be included in SIBx, and another part of the information might be included in another separate SIBy. In other embodiments, the control information may be split between SIB and MCCH, which indicates the scheduling information for specific MBS services. MCCH is a logic channel that can transmit the control information of the MBS services. It might include the configuration of the bearers and/or resource allocation (e.g., time and/or frequency domain indication) for that MBS services. The scheduling information of the MCCH could be carried in an SIB in one embodiment. The UE is able to determine the MBS service availability in certain cells on certain frequencies.

In one embodiment, the availability information of each MBS service in neighboring cells is provided in a broadcast control channel (e.g., MCCH). For example, in the MCCH, it may be indicated that in neighboring cell 1, cell 2, and cell 3, MBS service 1 is available. The control information in the access layer (e.g., a SIB) includes carrier frequencies for the current/serving and/or the neighboring carrier frequencies. The control information also includes the associated MBMS service area information, and the association of cell information of each MBMS service area. The information might be provided to the UE in dedicated signaling, in a separate SIB, or in multiple SIBs.

Impact to NG Control Plane Interface ("NG-C")

A network 5GC shall be able to be aware which RAN node (discussed with respect to FIGS. 1-2) to be selected initiates the MBS session start or which RAN node the requests to establish the resource for the MBS session. The information of SAI is exchanged between RAN node (e.g., gNB) and core network (e.g., on NG-C interfaces in procedures like NG-C Setup, and MBS session start.

In one example, the SAI information is indicated to 5GC (e.g., AMF, and possibly other 5GC functions e.g., MB-SMF, or MBSF/Multicast/Broadcast Service Function, directly or indirectly through AMF,) and the association between the SAI list and the RAN node (e.g., identified by the global gNB ID) is provided to 5GC.

In one example, the association between the SAI and the RAN node is carried in the NG Setup and/or gNB Configuration Update signaling. The purpose of the NG Setup procedure and gNB Configuration Update is to exchange application level data needed for the NG-RAN node and the AMF to correctly interoperate on the NG-C interface about the association of the RAN node and its associated SAI.

In the MBS session start signaling which is to request the NG-RAN node to assign resources on Uu and NG-U for the MBS session, the SAI or SAI list is indicated. Upon receiving the SAI information of the MBS service, gNB allocates the resources for the MBS session, including which cell to broadcast the MBS Service.

In another example, the SAI information and a cell list information (e.g., NCGI) are both carried in the MBS session start signaling. In such case, gNB determines which cell to broadcast the MBS.

Impact to User Plane Interface ("Xn")

The information of SAIs and the associated cells (identified by the cell information and the carrier frequency) in between gNBs can be exchanged on the Xn interface. Therefore, the association between the SAI and the cells will be available for neighboring gNBs. The above information may be provided by Xn signaling (e.g., Xn Setup and NG-RAN node Configuration Update procedures) or/and OAM. The cell can be identified by global cell identity or the PCI or both.

In one example, during the Xn setup procedure, gNB1 sends the association between the SAI and the cells which the gNB services or belongs to gNB1, to gNB2 in the Xn setup signaling. gNB1 can also send the association between the SAI and the cells which the gNB services or belongs to the gNB, to gNB2 in the NG-RAN node Configuration Update signaling after the Xn has been setup.

Impact to F1 Interface

In case of NR MBS and CU/DU split scenarios, it is needed for gNB-CU to be aware of the supported SAI or SAI list of each cell, therefore gNB-CU is able to notify 5GC about its associated SAI list. In later MBS session related signaling, 5GC is able to be aware which RAN node to be selected to initiate the MBS session start or which RAN node to request to establish the resource for the MBS session.

In case of NR MBS and CU/DU split scenarios, gNB-DU might need to provide the associated SAI of the gNB-DU Served Cells to CU. More specifically, the associated SAI or SAI list of each gNB-DU Served Cells is sent to gNB-CU in the F1 Setup, and/or gNB-DU Configuration Update message. In one example, cell1 identified by NR CGI 1 belongs to SAI1 and SAI2, therefore in the F1 Setup or gNB-DU Configuration Update message (in case of gNB-CU configuration update), the SAI1 and SAI2 associated with NR CGI is indicated to gNB-CU on the F1-C interface.

The information of SAIs and the associated cells (identified by the cell information and the carrier frequency) might be sent from one gNB-CU to gNB-DU on F1 interface. In one example, for two neighboring gNB-DUs, e.g., gNB-DU1 and gNB-DU2, the information of SAIs and the associated cells in gNB-DU1 (identified by the cell information and the carrier frequency) is sent from gNB-DU1 to gNB-CU; and the gNB-CU sends such association to the other gNB-DU, therefore the neighboring cells which belong to gNB-DU1, can be available for gNB-DU2, and such association can be provided to UE camping on cells served by gNB-DU2, which is used by the UE for awareness of the MBS.

MBS Context Management procedures that is to setup or modify the MBS context or resource allocation between gNB-CU and gNB-DU, the procedures might include MBS Context Setup, MBS Context Modification (gNB-CU initiated), MBS Context Modification Required (gNB-DU initiated).

In the MBS session start signaling which is to request the NG-RAN node to assign resources on Uu and NG-U for the MBS session, the MBS area information which indicates the RAN node to deliver the MBS service to might be included.

The MBS area information can be an SAI list. In one example, after receiving the MBS area information, gNB-CU might indicate a SAI list to gNB-DU, for example, in the MBS context setup request, and in the response information to that request, gNB-DU includes the MBS configuration per cell. In other words, gNB-DU determines which cell to provide the MBS service based on the SAI information provided by gNB-CU. In another example, after receiving the MBS area information, gNB-CU might indicate a cell list identified by NR Cell Global Identifier (NR CGI) list to gNB-DU, for example, in the MBS context setup request, and in the response information, gNB-DU includes the MBS configuration per cell. That is to say, gNB-CU determines which cell to provide the MBS service based on the SAI information provided by 5GC.

The MBS area information can be a SAI list and cell list. In one example, after receiving the MBS area information, gNB-CU might indicate a cell list to gNB-DU, for example, in the MBS context setup request, and in the response information to that request, gNB-DU includes the MBS configuration per cell. In other words, gNB-CU determines which cell to provide the MBS service based on the SAI information provided by 5GC. In one example, after receiving the MBS area information, gNB-CU might indicate a SAI information and a cell list to gNB-DU, for example, in the MBS context setup request, and in the response information to that request, gNB-DU includes the MBS configuration per cell. In other words, gNB-DU determines which cell to provide the MBS service based on the SAI information provided by gNB-CU.

The MBS area information can be a cell list. The cell list can be identified by NR Cell Global Identifier (NR CGI). After receiving the MBS area information, gNB-CU determines the SAI list based on the cell list provided by 5GC, and indicates the SAI list to gNB-DU, for example, in the MBS context setup request. In the response information, gNB-DU includes the MBS configuration per cell. In other words, gNB-DU determines which cell to provide the MBS service based on the SAI information provided by gNB-CU.

In another example, gNB-CU determines the SAI list based on the cell list provided by 5GC, and indicates both the SAI list and the cell list to gNB-DU, for example, in the MBS context setup request. In the response information, gNB-DU includes the MBS configuration per cell. That is to say, gNB-DU determines which cell to provide the MBS service based on the SAI information and the cell list provided by gNB-CU. In another example, gNB-CU indicates the cell list to gNB-DU. In the response information, gNB-DU includes the MBS configuration per cell.

In the above examples, based on the association between gNB-DU's serving cell and SAI, and the SAI information gNB-CU receives from 5GC, gNB-CU sends the MBS context setup request to gNB-DU, which serves the cells associated with the SAI. In the above examples, the MBS configuration might include the time and frequency domain resource allocation information per cell of the MBS session.

Frequency Priority Handling

Specifically, the frequency priority handling can be modified to account for service continuity of MBS. Specifically, for any frequency that provides MBS service availability will have its priority raised in the cell re-selection procedure. As described above, the UE can determine whether a MBS service of interest is available on specific frequencies, then the UE can increase the frequency priority handling for cell re-selection based on that determination. If the UE is capable of MBS reception and is receiving or interested to receive an MBS service, the UE may consider that frequency to be the highest priority in some embodiments.

In one example, the control information in the access layer of the serving cell indicates for that frequency includes one or more SAIs included and associated with that frequency. In another example, the UE is capable of MBS reception and the reselected cell is broadcasting one SIB that indicates the information for UE to locate the scheduling information of MBS services. This may be fulfilled when the SIB information that indicates the control information (with the scheduling information for specific MBS service) is provided or being scheduled in the potential reselecting cell. If those two examples are satisfied, the UE may set frequency to be the highest priority for frequency priority handling.

Cell Ranking Procedure

The frequency priority handling can be adjusted based on the MBS service availability. In another embodiment, the criteria for cell ranking can also be adjusted based on the MBS service availability. There may be multiple ways to rank cells during cell reselection. In some embodiments, MBS service availability is used to modify the rankings. In one embodiment, there may be an MBS offset that is added to the ranking for any cell that is providing UE interested MBS service. During cell re-selection, in case there may be multiple cells on a specific frequency, or there are frequencies of an equal priority, then the ranking may be used. The ranking R criterion is used for cell re-selection. The UE shall perform ranking R criterion for each cell that fulfills the cell selection criteria S. The UE re-selects a new cell when the new cell is better than the serving cell according to the cell reselection ranking during a time interval and more than another interval has elapsed since the UE camped on the current serving cell.

The cell-ranking criterion $R_s$ for serving cell and $R_n$ for neighboring cells is defined by:

$$R_s = Q_{meas,s} + Q_{hyst} - Q\text{offset}_{temp} + Q\text{offset}_{MBS}$$

$$R_n = Q_{meas,n} - Q\text{offset} - Q\text{offset}_{temp} + Q\text{offset}_{MBS}$$

$\text{Qoffset}_{MBS}$ is the MBS offset that is added to improve the ranking for cells with MBS service availability. It is added to the above cell-ranking criterion and may be in unit of dB in one embodiment. The UE considers $\text{Qoffset}_{MBS}$ to be valid during the MBS session of the interested MBS. For example, during the period that MBS session has started. The UE can search for a higher ranked cell on another frequency for cell reselection as soon as possible after the UE stops using $\text{Qoffset}_{MBS}$. In one embodiment, if $\text{Qoffset}_{MBS}$ is valid, Qoffset for inter-frequency neighbor cells is not used. $Q_{meas}$ is a RSRP measurement quantity used in cell re-selections for current serving cell and neighboring cells. $Q_{hyst}$ is a hysteresis value used to prevent ping-pong effect during cell re-selection. Qoffset is for intra-frequency and equals to $\text{Qoffset}_{s,n}$ (configured by the network, which specifies the offset between the two cells), if $\text{Qoffset}_{s,n}$ is valid, otherwise this equals to zero. For inter-frequency, Qoffset equals to $\text{Qoffset}_{s,n}$ plus $\text{Qoffset}_{frequency}$ (configured by the network, which specifies the frequency specific offset for equal priority NR frequencies), if $\text{Qoffset}_{s,n}$ is valid, otherwise it equals to $\text{Qoffset}_{frequency}$.

In some embodiments, $\text{Qoffset}_{MBS}$ is applied to the cells which provide or will provide the MBS service that UE is interested in or that UE is receiving based on the UE awareness of MBS that is described above. The cells are denoted as potential or concerned cells, which is providing UE interested MBS in some examples. QoffsetMBS may be configured per cell. Each above concerned cell might be configured with a different QoffsetMBS value. In another example, QoffsetMBS may be common to all concerned cells (including neighboring and current serving cell). In other words, only one common value of QoffsetMBS is configured, or a common QoffsetMBS is applied to all potential cells with MBS service availability. QoffsetMBS in some example is configured per frequency. Each potential/concerned frequency may be configured with a different QoffsetMBS value. In another example, QoffsetMBS may be common to all frequencies indicated in the control information (including neighboring and current frequencies). In another example, QoffsetMBS may be configured per SAI, such that each SAI is configured with a different QoffsetMBS value. In another example, QoffsetMBS may be common to all SAIs indicated in the control information. In other examples, QoffsetMBS may be configured per MBS service, such that each MBS service is configured with a different QoffsetMBS value. In other examples, QoffsetMBS may be common to all MBS services.

QoffsetMBS might be broadcast together with the control information in the access layer. For example, the offset and control information may be broadcast together with existing SIB information, including QoffsetMBS being provided in an existing SIB which is used for cell re-selection (e.g., SIB2, intra-frequency reselection as in SIB3, or inter-frequency re-selection as in SIB4), broadcast in a separate SIB, or broadcast in the serving cell within the MCCH. In one embodiment, the QoffsetMBS of each MBS service may be different, and configured in the MCCH in a per MBS service manner. In other examples, QoffsetMBS may not be configured, which indicates that the R criterion of the related cell, frequency, or all frequency and cells associated with the SAI is highest among the cells in the ranking procedure, or the value of QoffsetMBS used in the ranking will be infinite. In other examples, a value of QoffsetMBS used in the ranking can be interpreted as infinite if a certain value is configured (e.g. a reserved special value indicates infinite value).

In some embodiments, the cell reselection may occur among cells in one specific frequency f1. There may be a list of cells identified by PCI list of (e.g. PCI1-1, PCI1-2, PCI1-3, PCI1-4) that are identified or detected by the UE. The UE can identify that in cell PCI1-2 and PCI1-3 the MBS that UE is interested in or is receiving is provided or will be provided. Therefore, the ranking R criterion for cell ranking for cell PCI1-1 and PCI 1-3 will be added with an additional QoffsetMBS. The value of QoffsetMBS might be common for concerned cells or separately configured for each cell. In some examples, QoffsetMBS may be a positive value to raise the rank of the concerned cells to increase the possibility for UE to re-select to such cells.

In another embodiment, a UE re-selecting among cells in equal priority frequencies (e.g. a frequency list, f1, f2, f3, f5) may rely on a list of cells identified by PCI list (e.g. PCI1-1, PCI1-2, PCI2-1, PCI3-1, PCI5-1). However, UE may only be able to identify that only in cell PCI1-2 and PCI2-1 the MBS that UE is interested in or is receiving is provided or will be provided. Therefore, the ranking R criterion for cell ranking for cell PCI1-2 and PCI2-1 will be added with an additional QoffsetMBS.

UE Awareness of the MBS for Multicast

Figure 4B:
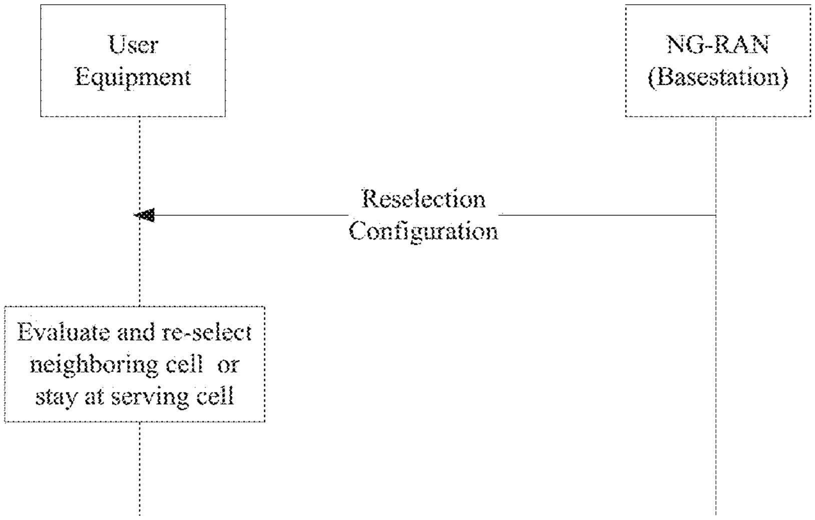
FIG. 4*b* shows another example communication.

FIG. 4*b* shows another example communication. The UE receives configuration information the basestation that can be used for cell reselection. The control information described above that is transmitted over the access layer includes service area information, frequency information, cell information and the association among each. For multicast service, the information needed for MBS service continuity may be different as described herein. In one embodiment, the reselection configuration shown in FIG. 4*b* may include area information. In other words, the UE is configured with area information in RAN where an MBS service of interest is available. The configuration is through dedicated RRC signaling (e.g., RRC Release), or broadcast signaling (e.g., MCCH). As with the embodiments above, the cell re-selection is for UE in RRC_INACTIVE state or an RRC_IDLE state.

In one embodiment, the UE is configured with the service availability of the MBS service of interest. The service availability information is configured to the UE together with, or as part of, the resource allocation configuration to the UE. For example, the configuration may include bearer configuration, allocated physical layer identification, or time and frequency domain information. The service availability configuration may include area information.

In a first example, the area information for the service availability configuration may include an area code list, such as a tacking area identity ("TAI") list, tacking area code ("TAC") list, RAN area code ("RAC") list, SAI, or system information area identification list. The UE is able to check the SIB (e.g. SIB1) in the re-selected cell to identify whether the potential cell is in the same service area of the interested MBS service.

In a second example, the area information for the service availability configuration may include a MBS service area identification that is defined to identify an MBS area in RAN ("MAIR"). The MAIR may be a list that can be broadcast in a SIB or MCCH. This information is used by the UE to determine MBS service continuity by selecting cells with MBS service availability. Specifically, the UE is able to check SIB1, other SIB, or MCCH in the re-selected cell to identify if the re-selected cell is in the same service area of the interested MBS service.

In a third example, the area information for the service availability configuration may include an NR cell identity list. The UE is able to check SIB1 of the re-selected cell to identify if the re-selected cell is in the same service area of the interested MBS service.

In a fourth example, the area information for the service availability configuration may include a PCI list with the frequency information associated with the PCI. The UE can rely on this information for MBS service continuity by selecting a cell within the same service area of the interested MBS service. The UE is able to identify whether the candidate cells during the cell re-selection procedure is in the same service area of the interested MBS service. For example, it may be used to identify the Synchronization Signal Block ("SSB") of the candidate cells during the cell re-selection.

The configuration information described above may be part of dedicated signaling, include an RRC Release message. In other embodiments, the information might be broadcast in the cell as part of the control information that further indicates the service transmission configuration. In this example there may be a dedicated channel (e.g. MCCH) broadcast in the cell.

In one embodiment, the UE is configured with service area information which includes a PCI list and the corresponding carrier frequency information of the MBS service of interest. This configuration is used for MBS service continuity. Specifically, the UE determines when the MBS service is available in the configured cell (on the cell identified by the PCI on the carrier frequency). The UE receives or continues the reception of the MBS service data in a non RRC_CONNECTED state based on this information. For cell re-selection, the UE can utilize the process described with respect to FIGS. 4*a*-4*b*, except rather than relying on control information, the UE considers the configured frequency to be the highest priority in Frequency Priority Handling, and the UE uses an offset for the configured cells for the criteria for cell ranking.

For example, a first UE (UE1) is interested in a first multicast service (MBS1), and is configured in the RRC Release message with the MBS configuration which further includes with cell identified by PCI0 on current frequency f0; PCI1 on carrier frequency f1, and PCI2/PCI3 on carrier frequency f2. UE continues the MBS1 reception in RRC_INAVTIVE in mobility. In the cell re-selection procedure, f0, f1, and f2 are all considered of the highest priority during the frequency priority handling. The cell ranking described above applies to this embodiment. During the cell ranking procedure, for cells identified by PCI0, PCI1, PCI2, and PCI3, the ranking is added with an offset value configured by the network (along with above configuration or in separate configurations) to ensure service continuity of MBS1. In another example, the offset of the cells is set to infinite, which may be implicit if the offset value is not configured, or may be explicit if an indication of an infinite value is indicated by the network. The cell with the highest ranking may then be selected.

In another embodiment, the UE might re-select a cell that does not provide MBS service. A cell configured where the MBS service is available might not be a suitable cell according to the other cell selection criterion. Therefore, the UE re-selects a cell which does not provide the MBS service. The cell re-selection procedure may not be impacted by the configured area information of UE interested MBS, when including an area ID list (e.g., TAI list, TAC list, RAC list, SAI, or system Information Area ID list, or MAIR list) or NCGI list. Once UE has re-selected to a cell, the UE checks the area information of the cell. In one example, when the UE is configured with the MAIR of the UE interested MBS service, then the UE checks if MAIR (which might be broadcast in the re-selected cell) of the re-selected cell is within the previously configured area information. If the re-selected cell does not belong to the configured area information, UE initiates the RRC Resume procedure, to resume to RRC_CONNECTED state. UE may carry an indication to network to cause initiation of the RRC Resume procedure. In this example, the cause value is "to continue MBS reception", or "failure of MBS reception." The network may then initiate the UE context fetch from the UE's last serving basestation. The fetch may include the MBS context, and the RAN initiated MBS session establishment in the re-selected basestation.

UE Behavior After Reselection

To ensure MBS service continuity, the same configuration of the MBS service is applied to multiple cells (including serving cell and neighboring cells). MBS service continuity continues based on a most recently used configuration, as long as that configuration is still valid.

The configuration that is considered in this embodiment includes a system information block ("SIB_MBS") that carries the information that is transmitted in BCCH. This information points to the resources where the MCCH can be found. For example, it may include the MCCH repetition period, Modification Period, radio frame offset, the first slot in the radio frame where MCCH can be scheduled, and/or duration during which the MCCH can be scheduled (e.g. a number of slots). A transmission window may be defined based on the above parameters, such that the same MCCH can be repeatedly transmitted in the transmission window with length of MCCH Modification Period. In other words, the MCCH information will be updated in the next modification period.

The configuration that is considered in this embodiment may also include MCCH, in which the information to indicate the scheduling information and/or bearer configuration of the MBS service. MCCH is broadcast in the cell, or can be configured to UE through dedicated signaling. The configuration information of MCCH repetition period and the Modification Period can be configured in MCCH for each MBS service. The configuration of MCCH repetition period and the Modification Period can be defined in MCCH for updating the configuration of an MB S service of interest.

The configuration information (SIB_MBS, or the MCCH) can also be sent to the UE through dedicated signaling (e.g., RRC Release signaling). In one embodiment, the UE is aware of which neighboring cells (on which frequency) are providing the MBS services the UE is interested in (e.g. neighboring cells) or is receiving (e.g. serving cell).

After UE has re-selected to such cell, the UE assumes that the cell is providing the UE's interested service. The UE may assume the above configuration is still valid based on the configuration received from the previous cell. Before the UE has been able to check the validity of the configuration, the UE continues using a previous configuration to receive the MBS service (UE has reselected a cell which is providing the MBS service). Since the previously received MBS configuration based on the modification period is still valid (within the same modification period from the moment UE has received the configuration in previous cell until UE has successfully reselected the new cell), the UE has not received a notification, which indicates that the MCCH is updated. Also, the UE has not been able to check the validity of the MCCH information, so UE tries to continue the reception of the MBS service based on the previous configuration. In one example, the UE monitors the MCCH in the next repetition period or modification period even if no notification is received.

For the radio bearers associated with the MBS session or MBS service (MBR radio bearers, MRB), UE may not perform PDCP re-establishment at the cell change in this example. In other words, UE maintains all the radio bearers associated with the interested or already receiving MBS services at a cell change. In other examples, UE reestablishes the RLC entities associated with the MRB. UE follows the same PDCP configuration for reordering timer, HFN, to process the PDCP PDU (including discarding the duplicated PDCP PDU with the same PDCP count) received in the reselected cell.

In another example, the UE checks whether UE has re-selected to a cell in the same service area in RAN. If the UE has reselected to a cell in the same service area, then UE continues the MBS reception based on the previously received valid configuration.

As described above in UE Awareness of the MBS for Multicast, the UE is configured with area information. The area information can be any of the four examples described above. The area information might be area code list that has already been defined in 3GPP, like TAI (Tacking area identity) list, TAC (Tacking area code) list RAC (RAN area code) list, SAI, or system Information Area ID list. Or the area information might be a MBS service area ID defined to identify an MBS area in RAN ("MAIR") list. The MAIR list may be broadcast in the SIB1, other SIB, or MCCH to aid UE to identify whether the MBS is available in the cell. Or the service area information in RAN might be an cell list (for example, NR Cell Identity list, or PCI list with the frequency information associated with the PCI). After the UE has reselected to a cell, the UE checks the area information provided in the reselected cell (based on SIB1, other SIB, or MCCH in the re-selected cell) whether the re-selected cell belongs to the area information associated with the interested MBS service.

After UE has re-selected to such cell, the UE assumes that the cell is providing the UE's interested service. The UE may assume the above configuration is still valid based on the configuration received from the previous cell. Before the UE has been able to check the validity of the configuration, the UE continues using a previous configuration to receive the MBS service (UE has reselected a cell which is providing the MBS service). Since the previously received MBS configuration based on the modification period is still valid (within the same modification period from the moment UE has received the configuration in previous cell until UE has successfully reselected the new cell), the UE has not received a notification, which indicates that the MCCH is updated. Also, the UE has not been able to check the validity of the MCCH information, so UE tries to continue the reception of the MBS service based on the previous configuration. In one example, the UE monitors the MCCH in the next repetition period or modification period even if no notification is received.

For the radio bearers associated with the MBS session or MBS service (MBR radio bearers, MRB), UE may not perform PDCP re-establishment at the cell change in this example. In other words, UE maintains all the radio bearers associated with the interested or already receiving MBS services at a cell change. In other examples, UE reestablishes the RLC entities associated with the MRB. UE follows the same PDCP configuration for reordering timer, HFN, to process the PDCP PDU (including discarding the duplicated PDCP PDU with the same PDCP count) received in the reselected cell.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for service continuity of a multicast broadcast service ("MBS") performed by a user equipment ("UE") in a wireless network, the method comprising:

receiving control information, the control information comprising a service area information, a frequency information, a cell information, and an association between the service area information, the frequency information, and the cell information;

determining a service availability for the MBS based on the control information;

receiving, when the UE has reselected a cell which provides a UE interested MBS service, the MBS service based on a last valid MBS resource allocation configuration received before the cell reselection, wherein the UE continues using the last valid MBS resource allocation configuration to receive the MBS service without receiving a new MBS resource allocation configuration from the reselected cell, the last valid MBS resource allocation configuration is within a same modification period from a moment the UE received the configuration in a previous cell until the UE has successfully reselected a new cell, and the UE monitors a multicast control channel (MCCH) in a next repetition period or modification period; and avoiding performing packet data convergence protocol ("PDCP") re-establishment at cell change.

2. The method of claim 1, wherein the service area information is a service area identity ("SAI") list, the cell information is a physical cell identification ("PCI") list, the frequency information is an absolute radio frequency channel number, and the association indicates that cells identified by the PCI list on the associated frequency belong to an associated SAI.

3. The method of claim 2, further comprising:

receiving a user service description ("USD") from a service layer;

determining whether a service is available in specific cells on specific frequencies based on whether the SAI associated with the UE interested MBS service indicated in the USD is also indicated in an access layer control information; and considering whether the UE interested MBS service is available in the cells on a frequency associated with the SAI.

4. The method of claim 1, further comprising:

selecting, during a priority handling in cell reselection, a cell from a plurality of cells based on awareness of the service availability for the MBS in the cells on specific frequencies, wherein the frequency on which the UE interested MBS service is available is considered to be a highest frequency.

5. The method of claim 1, wherein the cell reselection is based on a cell ranking that includes an offset for MBS that is added to the cell-ranking criterion for cells on which the MBS service is available.

6. The method of claim 1, wherein the control information is received from one or more system information blocks ("SIB") and part of the control information is in the one or more SIBs, and part of the control information is in a multicast control channel ("MCCH").

7. A method for service continuity of a multicast broadcast service ("MBS") performed by a network element in a wireless network, the method comprising:

providing control information over an access layer, wherein the control information comprises a service area information, a frequency information, a cell information, and an association between the service area information, the frequency information, and the cell information, wherein:

the control information is used by a user equipment (UE) to determine a service availability for the MBS; and sending, when the UE has reselected a cell which provides a UE interested MBS service, the MBS service based on a last valid MBS resource allocation configuration sent before the cell reselection, wherein the UE is configured to avoid performing data convergence protocol ("PDCP") re-establishment at cell change, and the UE continues using the last valid MBS resource allocation configuration to receive the MBS service without receiving a new MBS resource allocation configuration from the reselected cell, and wherein the last valid MBS resource allocation configuration is within a same modification period from a moment the UE received the configuration in a previous cell until the UE has successfully reselected a new cell, and the UE monitors a multicast control channel (MCCH) in a next repetition period or modification period.

8. The method of claim 7, wherein the control information is provided in one or more system information blocks ("SIB"), wherein part of the control information is in the one or more SIBs, and part of the control information is in a multicast control channel ("MCCH").

9. The method of claim 7, wherein the selecting is based on a cell ranking, and the cell ranking includes an offset for MBS.

10. The method of claim 9, wherein the offset is configured to the UE with the control information, or in a separate system information blocks ("SIB"), further wherein the service area information is received on an Radio Resource Control ("RRC") release signaling or on a multicast control channel ("MCCH").

11. A method for service continuity of a multicast broadcast service ("MBS") performed by a user equipment ("UE") in a wireless network, the method comprising:

receiving a service area information of the MBS;

determining a service availability for the MBS based on the service area information;

receiving, when the UE has reselected a cell belonging to a configured service area, a MBS service based on a last valid MBS resource allocation configuration received before the cell reselection, wherein the UE continues using the last valid MBS resource allocation configuration to receive the MBS service without receiving a new MBS resource allocation configuration from the reselected cell, the last valid MBS resource allocation configuration is within a same modification period from a moment the UE received the configuration in a previous cell until the UE has successfully reselected a new cell, and the UE monitors a multicast control channel (MCCH) in a next repetition period or modification period; and avoiding performing packet data convergence protocol ("PDCP") re-establishment at cell change.

12. The method of claim 11, wherein the service area information of the MBS is a physical cell identification ("PCI") list with frequency information associated with each PCI, which indicates that MBS service is available on such cell on the associated frequency.

13. The method of claim 11, wherein the UE handles a cell reselection procedure for selecting from a plurality of cells based on the MBS service availability in the cells on the associated frequency.

14. The method of claim 13, further comprising:

considering, during a priority handling in cell reselection, a frequency on which the UE interested MBS service is available to be a highest frequency.

15. The method of claim 13, wherein the cell reselection is based on a cell ranking that includes an offset for MBS that is added to a cell-ranking criterion for cells on which the MBS service is available.

16. The method of claim 11, further comprising:

checking whether a reselected cell belongs to service area information based on the information provided in the reselected cell.

17. The method of claim 16, wherein MBS service area identification that can identify an MBS area in RAN ("MAIR") is broadcast in the reselected cell in one or more system information blocks ("SIB") or in a multicast control channel ("MCCH").

18. The method of claim 11, wherein when the UE has not reselected a cell, the method comprises:

initiating Radio Resource Control ("RRC") resume with a cause value indicating a failure of MBS service continuity.

* * * * *